US012671120B2

(12) United States Patent
Kim et al.

(10) Patent No.: US 12,671,120 B2
(45) Date of Patent: Jun. 30, 2026

(54) CHARGE/DISCHARGE APPARATUS FOR SECONDARY BATTERY HAVING SUPPORT HOUSING MODULE

(71) Applicant: WONIK PNE CO., LTD., Suwon-si (KR)

(72) Inventors: Byunghum Kim, Suwon-si (KR); Hyoungjoong Kim, Suwon-si (KR); Woosik Han, Suwon-si (KR); Jeongmok Lee, Suwon-si (KR)

(73) Assignee: WONIK PNE CO., LTD., Suwon-si (KR)

( * ) Notice: Subject to any disclaimer, the term of this patent is extended or adjusted under 35 U.S.C. 154(b) by 718 days.

(21) Appl. No.: 18/126,427

(22) Filed: Mar. 25, 2023

(65) Prior Publication Data

US 2023/0307728 A1    Sep. 28, 2023

(30) Foreign Application Priority Data

Mar. 25, 2022    (KR) ........................ 10-2022-0037417
Mar. 25, 2022    (KR) ........................ 10-2022-0037418

(51) Int. Cl.
*H01M 10/44*        (2006.01)
*H01M 10/6554*    (2014.01)
*H01M 50/204*      (2021.01)

(52) U.S. Cl.
CPC ....... *H01M 10/44* (2013.01); *H01M 10/6554* (2015.04); *H01M 50/204* (2021.01)

(58) Field of Classification Search
CPC ............ H01M 10/44; H01M 10/6554; H01M 50/204; H01M 10/441; H01M 10/446;
(Continued)

(56) References Cited

U.S. PATENT DOCUMENTS

2023/0038972 A1* 2/2023 Lee ....................... H01M 10/48
2023/0045364 A1* 2/2023 Lee .................... G01R 31/3865
(Continued)

FOREIGN PATENT DOCUMENTS

CN        104953183 A      9/2015
CN        108539279 A   *  9/2018   .......... H01M 10/058
(Continued)

OTHER PUBLICATIONS

Google search results for "define TM screw", no author, retrieved on Jan. 21, 2026. (Year: 2026).*

(Continued)

*Primary Examiner* — Jared Fureman
(74) *Attorney, Agent, or Firm* — Maschoff Brennan

(57)        ABSTRACT

Proposed is an apparatus for charging and discharging a secondary battery, the apparatus including a support housing module that includes a first support frame, a second support frame, a screw support bracket provided between the first support frame and the second support frame that constitute one pair, a first moving screw, one end portion thereof being combined with the first support frame and another end portion thereof being combined with the screw support bracket, a second moving screw, one end portion thereof being combined with the second support frame and another end portion thereof being combined with the screw support bracket, a first pressing assembly being moved along a lengthwise direction of the first moving screw, and a second pressing assembly being moved along a lengthwise direction of the second moving screw, wherein pressure sensor units are provided on the first pressing assembly.

12 Claims, 12 Drawing Sheets

(58) Field of Classification Search
CPC .... H01M 50/264; H01M 10/0481; H02J 7/70;
H02J 7/751; H02J 7/50
See application file for complete search history.

(56) References Cited

U.S. PATENT DOCUMENTS

| | | | |
|---|---|---|---|
| 2023/0303335 A1* | 9/2023 | Kim ....................... | B65G 39/12 |
| 2023/0378580 A1* | 11/2023 | Taherkhani ....... | H01M 10/4214 |

FOREIGN PATENT DOCUMENTS

| | | | | | |
|---|---|---|---|---|---|
| CN | 108832182 A | * | 11/2018 | .......... | H01M 10/058 |
| CN | 109818077 A | | 5/2019 | | |
| CN | 111710895 A | | 9/2020 | | |
| EP | 3 886 231 A1 | | 9/2021 | | |
| KR | 10-2012-0038218 A | | 4/2012 | | |
| KR | 10-2017-0118993 A | | 10/2017 | | |
| KR | 10-2019-0011711 A | | 2/2019 | | |
| KR | 10-2020-0041710 A | | 4/2020 | | |
| KR | 20220101269 A | * | 7/2022 | .......... | H01M 4/0447 |
| WO | WO-2021129163 A1 | * | 7/2021 | ........... | H01M 50/20 |
| WO | 2021/194236 A1 | | 9/2021 | | |

OTHER PUBLICATIONS

Extended European Search Report dated Jan. 26, 2024 as received in Application No. 23164076.4.
KR Office Action dated Jun. 22, 2024 in application 10-2022-0037418.

* cited by examiner

CHARGE/DISCHARGE APPARATUS FOR SECONDARY BATTERY HAVING SUPPORT HOUSING MODULE

TECHNICAL FIELD

The present disclosure relates to an apparatus for charging and discharging a secondary battery, the apparatus including a support housing module and, more particularly, to an apparatus for charging and discharging a secondary battery, the apparatus having a pressure sensor unit configured to precisely measure pressure for pressing that is applied to a battery cell.

BACKGROUND ART

Secondary batteries are also widely used as an electric power source for driving an electric vehicle, as well as a mobile device, such as a portable phone, a notebook computer, or a camcorder. Particularly, the use of lithium secondary batteries is rapidly increased because it has advantages, such as a high operating voltage and a high energy density per unit weight.

Normally, secondary batteries, such as lithium batteries and lithium-polymer batteries, undergo varies processes, such as an aging process, a charging and discharging process, an open circuit voltage (OCV) inspection process, an internal resistance (IR) inspection process, and a grading process, at a manufacturing factory before shipment. Among these, the charging and discharging process is a critical process that determines quality of a secondary battery produced.

The process of charging and discharging the secondary battery is performed in an apparatus for charging and discharging a secondary battery.

The apparatus for charging and discharging the secondary battery includes a plurality of pressing plates. In a state where a battery cell is inserted, for charging and discharging, between each of the plurality of pressing plates, the battery cell presses against the battery cell with a predetermined pressure.

In the state where the battery cell is pressed by the pressing plate, an electrode lead gripper module applies electric current to an electrode lead provided on the battery cell, and thus performs the process of charging and discharging the battery cell. The apparatus for charging and discharging the secondary battery performs charging and discharging of the battery cell temperature and pressure ranges that are required in such a manner that activation of the battery cell is enhanced.

However, a pressure sensor unit provided in the apparatus for charging and discharging a secondary battery in the related art serves to measure pressure applied to the battery cell, but is configured to measure only pressure that is applied to the center portion of the pressing plate that presses against the battery cell. When pressure for pressing, applied to the left side of the pressing plate, and pressure for pressing, applied to the right side thereof, are different in magnitude, the pressure sensor unit in the related art has the problem of not recognizing this difference.

Therefore, there is a need to perform research and development on various apparatuses for charging and discharging the secondary battery, which are capable of being configured to precisely monitor the difference in magnitude between the pressure for pressing, applied to the left side of the pressing plate and the pressure for pressing, applied to the right side thereof.

SUMMARY OF INVENTION

Technical Problem

An object of the present disclosure, which is made in order to solve the above-mentioned problem, is to provide a support housing module including a pressure sensor unit configured to precisely measure pressure for pressing that is applied to a battery cell, and an apparatus for charging and discharging a secondary battery, having the support housing module.

Solution to Problem

In order to accomplish the above-mentioned object, according to an aspect of the present disclosure, there is provided an apparatus for charging and discharging a secondary battery, the apparatus including a support housing module, wherein the support housing module includes: a first support frame; a second support frame spaced a predetermined distance apart by a support shaft from the first support frame and paired with the first support frame; a screw support bracket fixed to the support shaft by being supported thereon and provided between the first support frame and the second support frame; a first moving screw, one end portion thereof being combined with the first support frame and the other portion thereof being combined with the screw support bracket; a second moving screw, one end portion thereof being combined with the second support frame and the other portion thereof being combined with the screw support bracket; a first pressing assembly being moved along a lengthwise direction of the first moving screw as the first moving screw is rotated; and a second pressing assembly being moved along a lengthwise direction of the second moving screw as the second moving screw is rotated, and wherein pressure sensor units are provided on the first pressing assembly in such a manner as to be symmetrical about an imaginary vertical line passing the center of the first pressing assembly.

Advantageous Effects of Invention

The support housing module and the apparatus for charging and discharging a secondary battery, having the support housing module, according to the present disclosure have the following effects.

According to the present disclosure, the pressure sensor units that measure the pressure for pressing against the battery cell are provided in such a manner as to be symmetrical about an imaginary vertical passing the center of the pressing assembly. Thus, the difference in magnitude between the pressure, applied to the left side of the pressing plate, and the pressure for pressing, applied to the right side thereof, can be precisely monitored. Therefore, the apparatus for charging and discharging a secondary battery can press against the pressing plate with uniform pressure without being unequally distributed to the left or right side of the pressing plate, on the basis of information on the pressure for pressing that is measured by the pressure sensor unit.

The present disclosure is not limited to the effects mentioned above, and it would be understood that any other effect is possibly inferred from Description of Embodiments or constituent elements recited in the claims.

DESCRIPTION OF EMBODIMENTS

Figure 1:
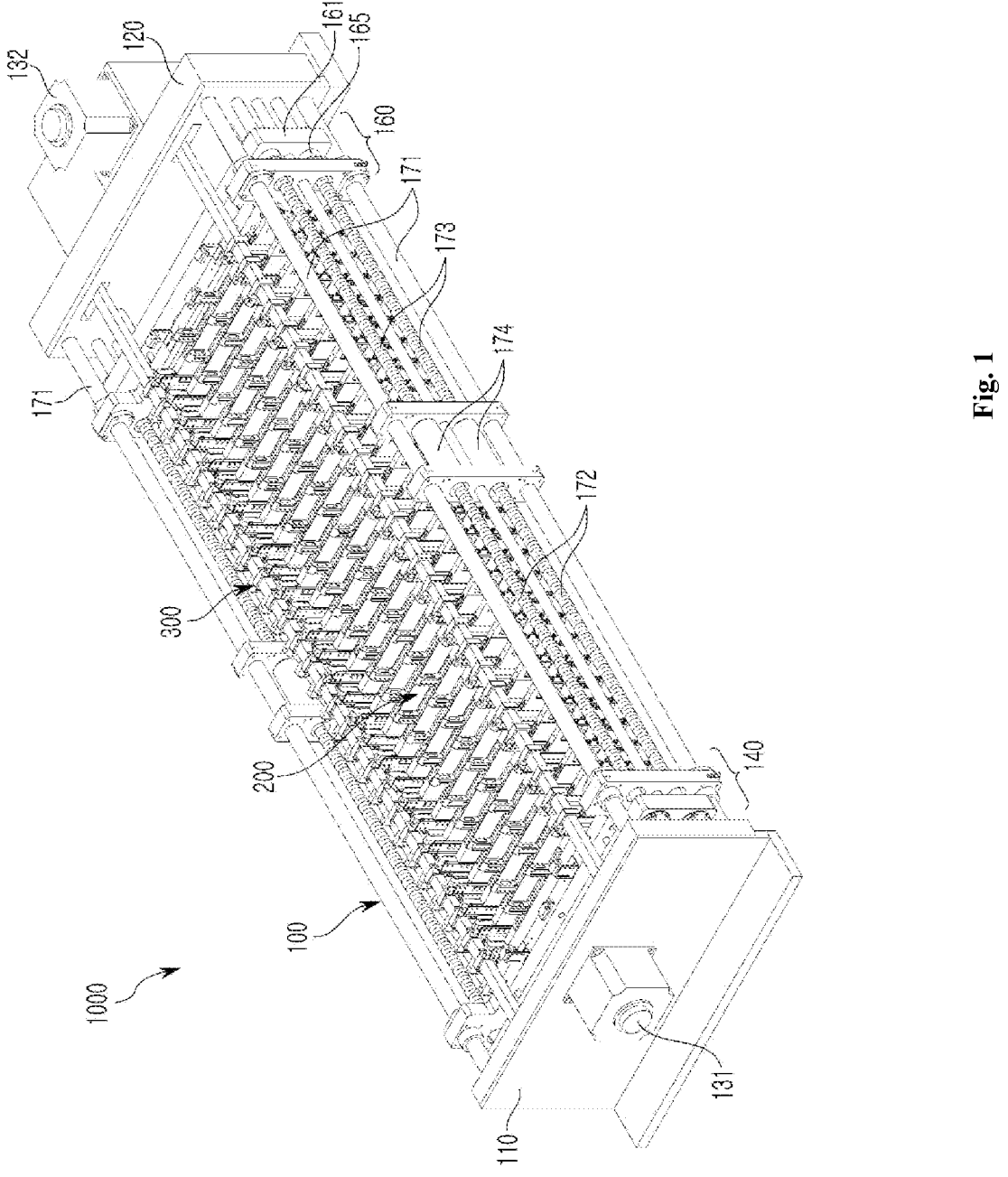
FIG. 1 is a perspective view illustrating an apparatus for charging and discharging a secondary battery according to a first embodiment of the present disclosure.

Embodiments of the present disclosure will be described below with reference to the accompanying drawings. However, the present disclosure may be implemented in various different forms and therefore is not limited to the embodiments thereof that are described below. In order to definitely describe the embodiments of the present disclosure, a constituent element not associated with the description is omitted from the drawings, and the same constituent elements are given the same reference numeral throughout the present specification.

In addition, when a constituent element is referred to as being "connected to" one other constituent element, the constituent element may be "directly connected to" one other constituent element or may be "indirectly connected to" one other constituent with a third constituent element member in between." Unless otherwise specified, the expression "includes a certain constituent element" means that other constituent element may further be included, not that any other constituent element is excluded.

Through the present specification, the terms "over" and "under" mean being at higher and lower levels, respectively, than something, but not necessarily in the direction of gravity.

The embodiments of the present disclosure will be described in detail below with reference to the accompanying drawings.

Figure 2:
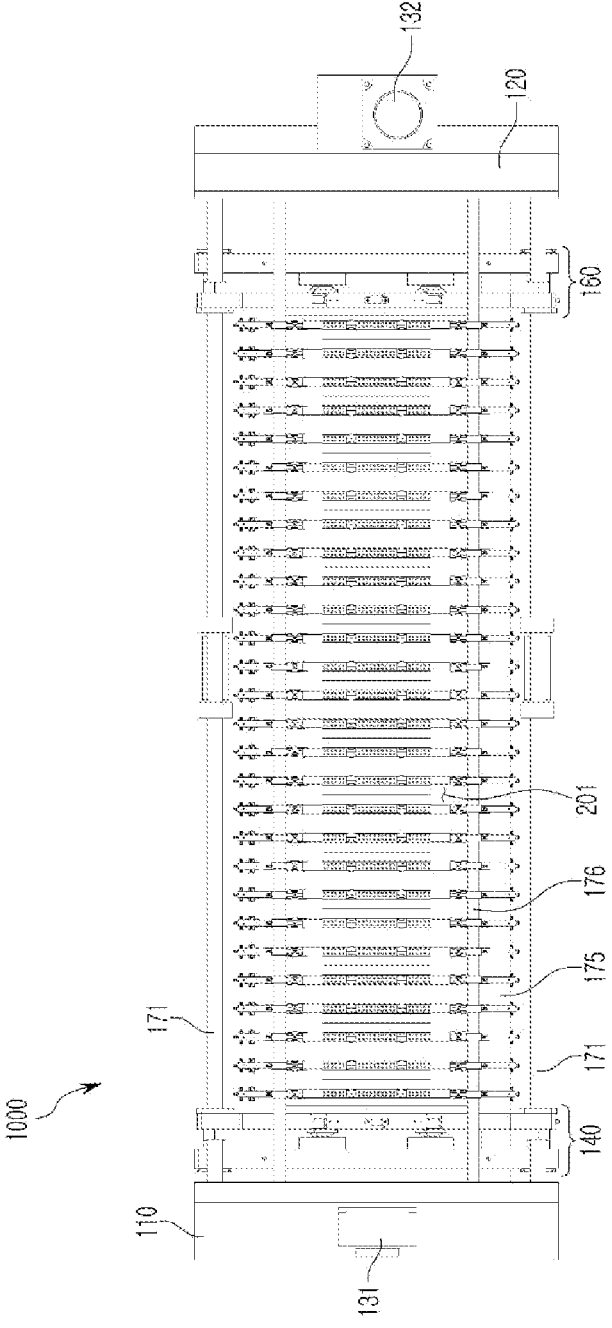
FIG. 2 is a view illustrating the apparatus for charging and discharging a secondary battery according to the first embodiment of the present disclosure, when viewed from above.
Figure 3:
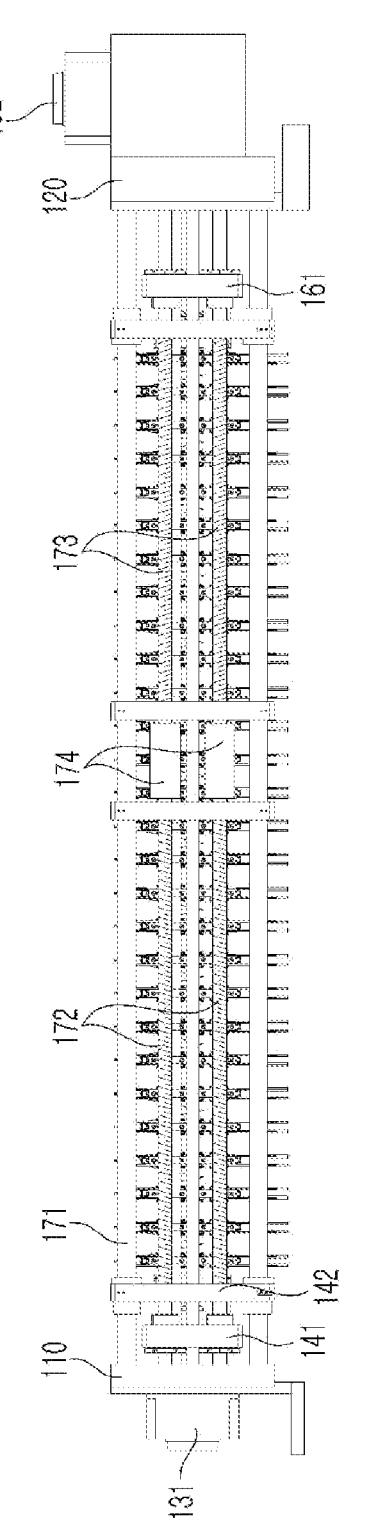
FIG. 3 is a view illustrating the apparatus for charging and discharging a secondary battery according to the first embodiment of the present disclosure, when viewed from front.
Figure 4:
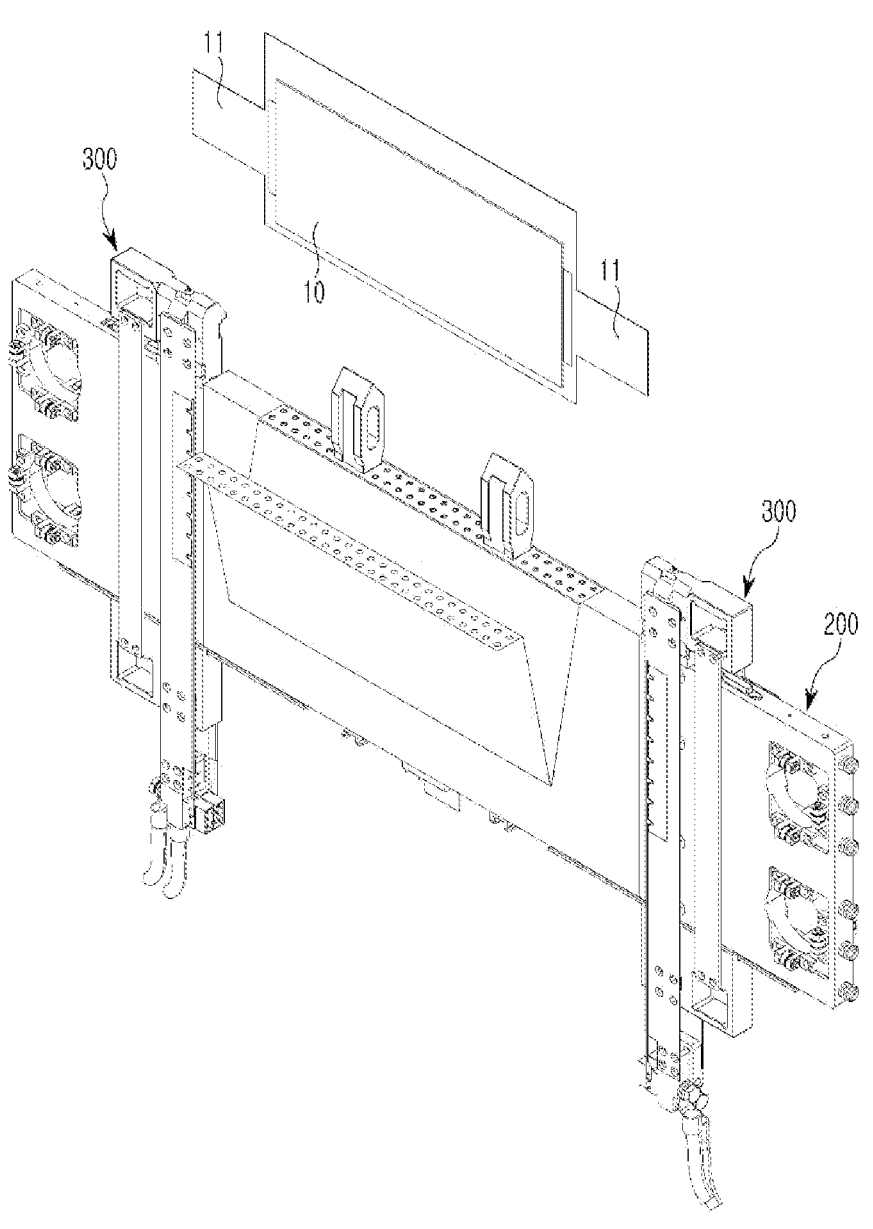
FIG. 4 is a perspective view illustrating a cell pressing module and an electrode lead gripper module according to the first embodiment of the present disclosure.
Figure 5:
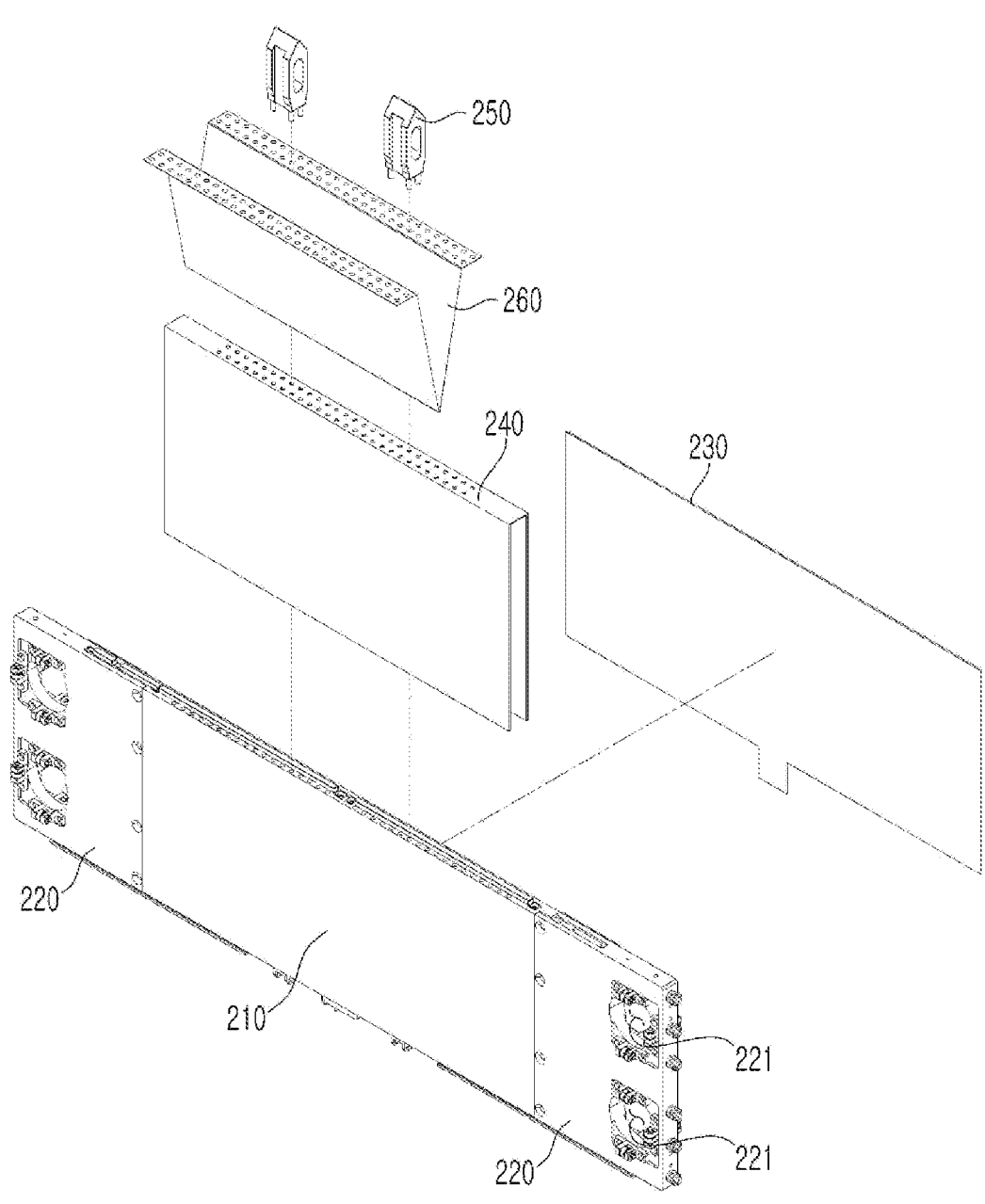
FIG. 5 is an exploded perspective view illustrating the cell pressing module according to the first embodiment of the present disclosure.

FIG. 1 is a perspective view illustrating an apparatus for charging and discharging a secondary battery according to a first embodiment of the present disclosure. FIG. 2 is a view illustrating the apparatus for charging and discharging a secondary battery according to the first embodiment of the present disclosure, when viewed from above. FIG. 3 is a view illustrating the apparatus for charging and discharging a secondary battery according to the first embodiment of the present disclosure, when viewed from front. FIG. 4 is a perspective view illustrating a cell pressing module and an electrode lead gripper module according to the first embodiment of the present disclosure. FIG. 5 is an exploded perspective view illustrating the cell pressing module according to the first embodiment of the present disclosure.

As illustrated in FIGS. 1 to 5, an apparatus 1000 for charging and discharging a secondary battery may include a support housing module 100, a cell pressing module 200, and an electrode lead gripper module 300.

The support housing module 100 is configured to form an entire exterior appearance of the apparatus 1000 for charging and discharging a secondary battery and to support various constituents that are included in the apparatus 1000 for charging and discharging a secondary battery.

The support housing module 100 may include a first support frame 110, a second support frame 120, a first pressing drive unit 131, a first pressing assembly 140, a second pressing drive unit 132, a second pressing assembly 160, a support shaft 171, a first moving screw 172, a second moving screw 173, a screw support bracket 174, a plate moving shaft 175, and a gripper moving shaft 176.

The first support frame 110 and the second support frame 120 constitute one pair, and the first support frame 110 and the second support frame 120 are arranged to be spaced a predetermined distance apart. The first support frame 110 and the second support frame 120 may be fixed to the support shaft 171 by being supported thereon.

A plurality of pressing plate 210 that press against a pouch-type battery cell 10 and a plurality of electrode lead gripper modules 300 that activate a battery cell through charging and discharging of the pouch-type battery cell 10 may be arranged between the first support frame 110 and the second support frame 120 that are arranged to be spaced apart in this manner.

Then, the first pressing drive unit 131 is fixed to the first support frame 110 by being supported thereon. The first pressing drive unit 131 may be a power source, such as a motor.

The first pressing drive unit 131 controls a movement of the first pressing assembly 140 that presses against the cell pressing module 200. A motive power generated from the first pressing drive unit 131 may be transferred to the first moving screw 172 through a plurality of gears (not illustrated), and thus the first moving screw 172 may be rotated.

The first pressing assembly 140 is combined with the first moving screw 172 in a manner that forms a TM screw. Thus, the first pressing assembly 140 may be moved along a lengthwise direction of the first moving screw 172 when the first moving screw 172 is rotated. For example, in a case where the first pressing drive unit 131 is rotated forward, the first pressing assembly 140 may be moved toward the second support frame 120. Moreover, in a case where the first pressing drive unit 131 is rotated backward, the first pressing assembly 140 may be moved away from the second support frame 120. A moving direction of the first pressing assembly 140 may vary according to a rotational direction (the forward direction or the backward direction) of the first pressing drive unit 131.

One end portion of the first moving screw 172 that guides the moving direction of the first pressing assembly 140 is supported on the first support frame 110, and the other end portion thereof is rotatable in a state of being supported on the screw support bracket 174.

The screw support bracket 174 is provided between the first support frame 110 and the second support frame 120 and is fixed to the support shaft 171 by being supported thereon.

The second pressing drive unit 132 is fixed to the second support frame 120 by being rotated thereon. The second pressing drive unit 132 may be a power source, such as a motor.

The second pressing drive unit 132 controls a movement of the second pressing assembly 160 that presses against the cell pressing module 200. A motive power generated from the second pressing drive unit 132 may be transferred to the second moving screw 173 through a plurality of gears (not illustrated).

The second pressing assembly 160 may be combined with the second moving screw 173 in a manner that forms a ball screw, and thus the second pressing assembly 160 may be moved along a lengthwise direction of the second moving screw 173 when the second moving screw 173 is rotated. For example, in a case where the second pressing drive unit 132 is rotated forward, the second pressing assembly 160 may be moved toward the first support frame 110. Moreover, in a case where the second pressing drive unit 132 is rotated backward, the second pressing assembly 160 may be moved away from the first support frame 110. That is, a moving direction of the second pressing assembly 160 may vary according to a rotational direction (the forward rotation or the backward direction) of the second pressing drive unit 132.

One end portion of the second moving screw 173 that guides the moving direction of the second pressing assembly 160 is supported on the second support frame 120, and the other end portion thereof is rotatable in a state of being supported on the screw support bracket 174.

For an activation operation, a plurality of the battery cells 10 picked up from a battery pick-up apparatus (not illustrated) may be inserted into battery insertion spaces 201, respectively, each of which is formed between the pressing plates 210 arranged adjacent to each other. At this point, the pressing plates 210 that are arranged adjacent to each other may be connected to each other by a slip sheet 260, and the battery cell 10 inserted into the battery insertion space 201 may be seated on the slip sheet 260.

In a case where the battery cell 10 is seated on the slip sheet 260 in this manner, the first pressing assembly 140, which is combined with the first moving screw 172 in a manner that forms the TM screw, is moved at a fast speed to a predetermined reference position.

In a state where the first pressing assembly 140 is moved to the predetermined reference position, the second pressing assembly 160, which is combined with the second moving screw 173 in a manner that forms the ball screw, precisely controls a movement of the pressing plate 210 in such a manner that the battery cell 10 is pressed with required pressure for pressing. In this manner, the apparatus 1000 for charging and discharging a secondary battery may shorten the time taken to move the pressing plate 210, through the selective movements of the first pressing assembly 140 and the second pressing assembly 160 and at the same time may precisely control the pressure for pressing that is applied to the battery cell 10.

As described above, the first pressing assembly 140 is combined with the first moving screw 172 in a manner that forms the TM screw and the second pressing assembly 160 is combined with the second moving screw 173 in a manner that forms the ball screw. Accordingly, the time taken to move the pressing plate 210 that presses against the battery cell 10 may be shortened, and adjustment of the pressure for pressing against the battery cell 10 may be controlled more precisely. That is, the first pressing assembly 140 and the second pressing assembly 160 are combined with the moving screws, respectively, in such a manner as to form screws of different shapes. Accordingly, in a state where the first pressing assembly 140 is first fast moved to a required reference position, the second pressing assembly 160 may then press against the battery cell 10 in a more precise manner.

A plurality of the cell pressing modules 200 may be provided between the first support frame 110 and the second support frame 120.

The cell pressing module 200 may include the pressing plate 210, a movement guiding unit 220, a heating pad 230, a protective pad 240, a pocket guide 250, and the slip sheet 260.

The pressing plate 210 is configured to press against the battery cell 10 seated on the slip sheet 260.

The movement guiding unit 220 is provided on both sides of the pressing plate 210. The movement guiding unit 220 is configured to be movable along a lengthwise direction of the plate moving shaft 175 that is connected to the first support frame 110 and the second support frame 120. That is, a movement guiding hole 221 into which the plate moving shaft 175 is inserted for passing-through is formed in the movement guiding unit 220. Thus, the movement guiding unit 220 may be moved along the lengthwise direction of the plate moving shaft 175 as the first pressing assembly 140 and the second pressing assembly 160 are moved.

The pressing plate 210 is configured to be detachably attached to the movement guiding unit 220. Therefore, in a case where the pressing plate 210 needs to be maintained, an operator may simply separate the pressing plate 210 from the movement guiding unit 220.

For reference, a cell pressing module in the related art is not configured to have a movement guiding unit configured to be detachably attached to a pressing plate. A movement guiding hole into which the plate moving shaft 175 is inserted for passing-through is formed in both sides of a pressing plated in the related art. However, the pressing plate in the related art, when required to be replaced, has to be replaced in a state where all pressing plates, arranged before it, are separated from the plate moving shaft 175. Accordingly, it is difficult to perform an operation of replacing the pressing plate in the related art. In contrast, because the pressing plate 210 according to the present disclosure is configured in such a manner as to be detachably attached to the movement guiding unit 220, an operation of replacing the pressing plate 210 may be simply performed.

Then, the heating pad 230 is configured to heat the pressing plate 210 to a predetermined temperature. The pressing plate 210 presses against the battery cell 10 with predetermined pressure for pressing in a state of being heated to the predetermined temperature by the heating pad 230.

The protective pad 240 is configured to prevent the pressing plate 210 from causing damage to a surface of the battery cell 10 while the pressing plate 210 presses against the battery cell 10.

The pocket guide 250 is configured to fix the slip sheet 260 and the protective pad 240 to the pressing plate 210 and at the same time to guide an insertion direction of the battery cell 10 in such a manner that the plurality of the battery cells 10 picked up from the battery pickup apparatus are stably inserted into the battery insertion spaces 201, respectively.

The electrode lead gripper module 300 is configured to be movable along a width direction of the cell pressing module 200 in a state of being inserted into the cell pressing module 200. For example, the electrode lead gripper module 300 is configured to be moved selectively along the width direction of the cell pressing module 200 according to a size of the battery cell 10 and to be in a pressurized manner brought into contact with an electrode lead 11 provided on the battery cell 10.

The electrode lead gripper modules 300 constituting one pair may be provided on both sides, respectively, of the cell pressing module 200.

In a state of being brought into contact with the electrode lead 11 by pressure in such a manner as to make an electric connection, the electrode lead gripper module 300 recognizes whether the battery cell 10 is charged or discharged and whether or not the battery cell 10 is defective.

In this manner, the apparatus 1000 for charging and discharging a secondary battery charges and discharges the battery cell 10 in a state where the pressing plate 210 presses against the battery cell 10. Accordingly, a swelling phenomenon where the battery cell 10 is swelled due to expansion of the battery cell 10 or occurrence of gas is prevented from occurring, and it is precisely recognized whether or not the battery cell 10 is defective.

Figure 6:
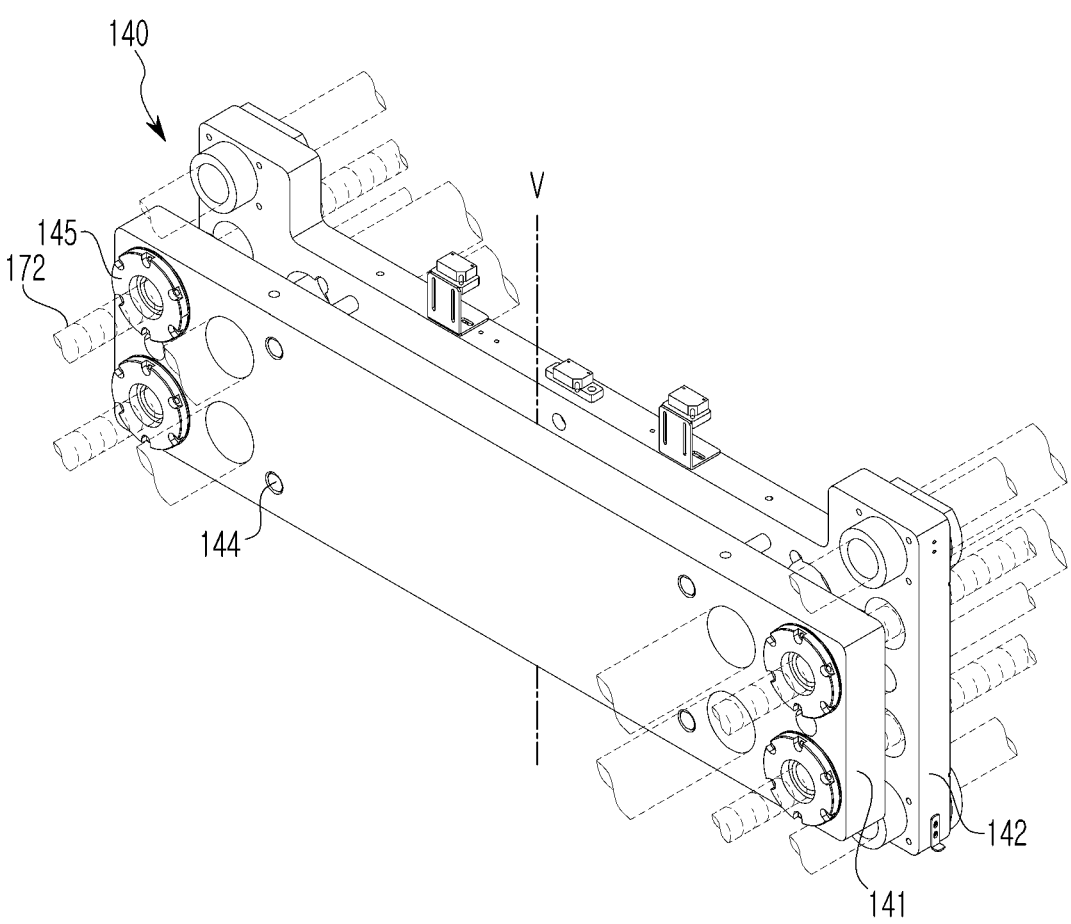
FIG. 6 is a perspective view illustrating a first pressing assembly according to the first embodiment of the present disclosure, when viewed from one side.
Figure 7:
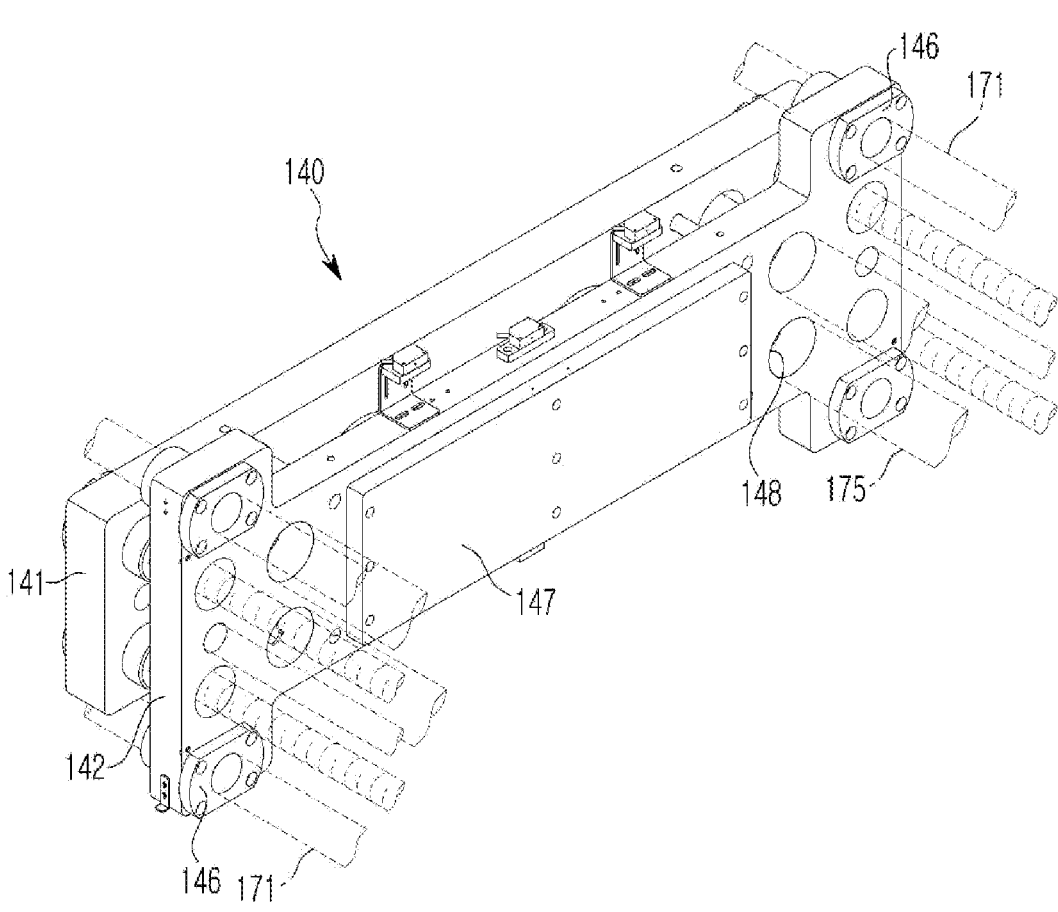
FIG. 7 is a perspective view illustrating the first pressing assembly according to the first embodiment of the present disclosure, when viewed from the other side.
Figure 8:
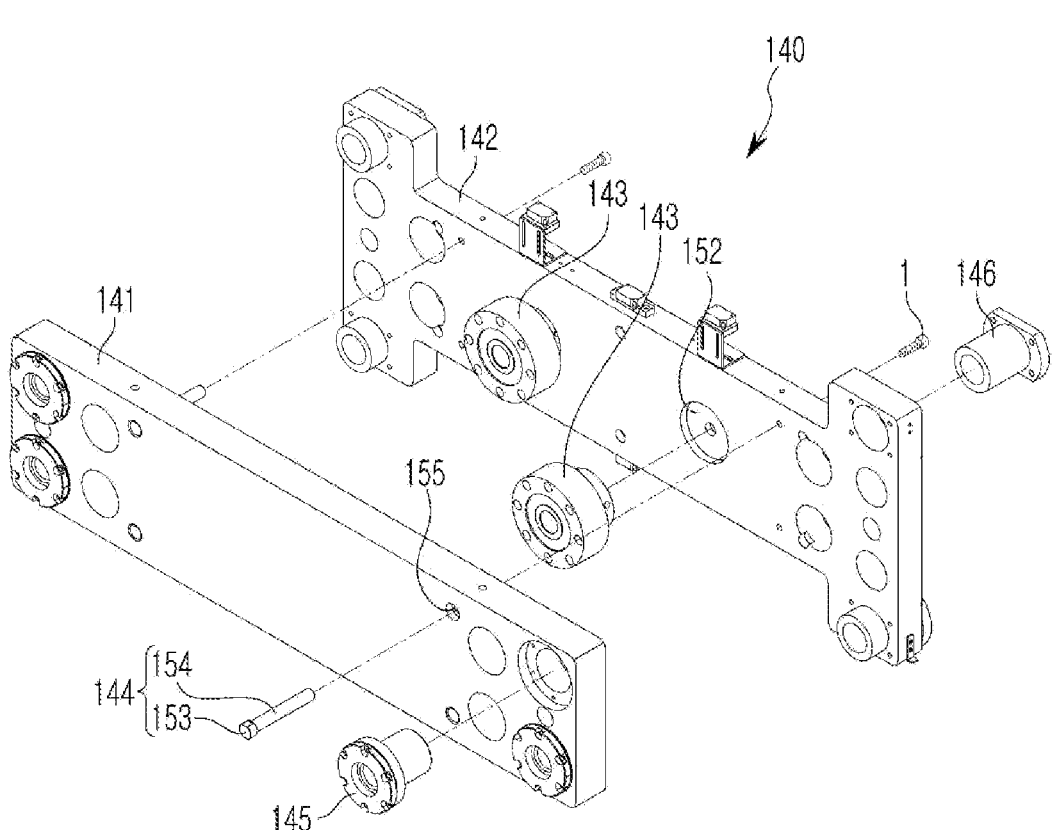
FIG. 8 is an exploded perspective view illustrating the first pressing assembly according to the first embodiment of the present disclosure, when viewed from one side.
Figure 9:
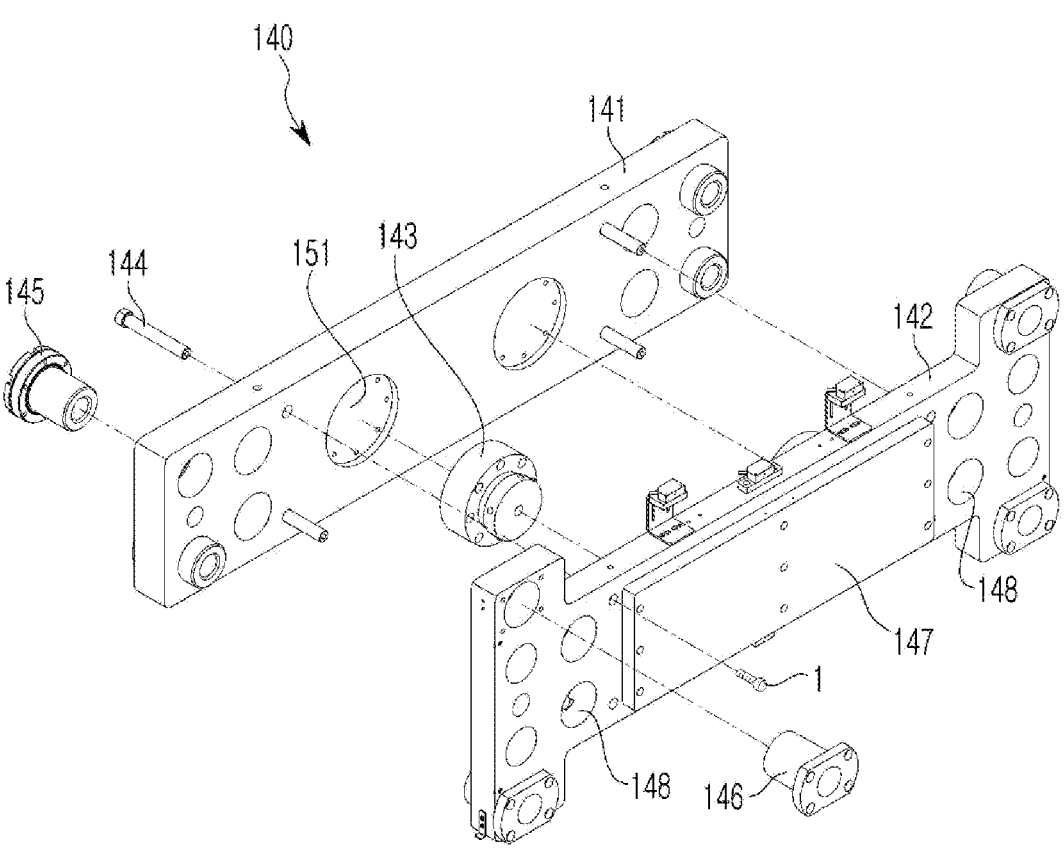
FIG. 9 is an exploded perspective view illustrating the first pressing assembly according to the first embodiment of the present disclosure, when viewed from the other side.

FIG. 6 is a perspective view illustrating the first pressing assembly according to the first embodiment of the present disclosure, when viewed from one side. FIG. 7 is a perspective view illustrating the first pressing assembly according to the first embodiment of the present disclosure, when viewed from the other side. FIG. 8 is an exploded perspective view illustrating the first pressing assembly according to the first embodiment of the present disclosure, when viewed from one side. FIG. 9 is an exploded perspective view illustrating the first pressing assembly according to the first embodiment of the present disclosure, when viewed from the other side.

As illustrated in FIGS. 6 to 9, the first pressing assembly 140 and the second pressing assembly 160 are configured to provide the pressure for pressing to the pressing plate 210 that directly presses again the battery cell 10.

The first pressing assembly 140 and the second pressing assembly 160 are configured in such a manner as to correspond to each other. As an example, the first pressing assembly 140 is representatively described with reference to FIGS. 6 to 9. However, the first pressing assembly 140 may further include a pressure sensor unit 143 that measures the pressure for pressing against the battery cell 10.

The first pressing assembly 140 may include a first moving plate 141, a first push plate 142, the pressure sensor unit 143, and a separation prevention pin 144.

The first moving plate 141 is moved along the lengthwise direction of the first moving screw 172 as the first moving screw 172 is rotated. A first screw nut 145 that is combined with the first moving screw 172 is provided on both sides of the first moving plate 141, and thus the first moving plate 141 is moved forward or backward according to a rotational direction of the first moving screw 172.

The first moving screw 172 and the first screw nut 145 may be combined with each other in a manner forms the TM screw.

With reference to FIG. 1, a second screw nut 165 that is provided on a second moving plate 161 is combined with a second moving screw 173. The second moving screw 173 and the second screw nut 165 may be combined with each other in a manner that forms the ball screw.

With reference back to FIGS. 6 to 9, the first push plate 142 is configured to provide the pressing plate 210 with the pressure for pressing that is transferred from the first moving plate 141.

A first shaft nut 146 into which the support shaft 171 is inserted for passing-through is provided on both sides of the first push plate 142. Therefore, the first push plate 142 may be moved along a lengthwise direction of the support shaft 171 while the first moving screw 172 is moved. The first push plate 142 may be stably moved, by the support shaft 171, without being shaken.

A pressure-for-pressing transfer member 147 is provided on the first push plate 142. The pressure-for-pressing transfer member 147 protrudes from one surface of the first push plate 142 and presses against the pressing plate 210 arranged adjacent to the first push plate 142.

The pressure-for-pressing transfer member 147 is provided between first through-holes 148, symmetrically formed in both sides, respectively, of the first push plates 142 into which the plate moving shafts 175, respectively, are inserted for passing-through.

The pressure sensor unit 143 is configured to measure the pressure for pressing against the battery cell 10.

The pressure sensor unit 143 is provided between the first moving plate 141 and the first push plate 142.

One side of the pressure sensor unit 143 is inserted into a first sensor support groove 151 formed in the first moving plate 141. The other side of the pressure sensor unit 143 is inserted into a second sensor support groove 152 formed in the first push plate 142. In this state, the pressure sensor unit 143 is configured to measure the pressure for pressing against the battery cell 10. The pressure sensor unit 143 measures the pressure for pressing against the battery cell 10 while the apparatus 1000 for charging and discharging a secondary battery presses again the battery cell 10.

The pressure sensor unit 143 provided between the first moving plate 141 and the first push plate 142 may be prevented, by the separation prevention pin 144, from being separated out of the first moving plate 141 and the first push plate 142.

The separation prevention pin 144 has a head portion 153 and an extension portion 154, and the other end portion of the extension portion 154 is fixed, by a fastening member 1, to the first push plate 142.

The head portion 153 is provided on one end portion of the extensions portion 154. The head portion 153 may be supported on a stepped-jaw groove 155 formed in the first moving plate 141, in a state of being inserted into the stepped-jaw groove 155.

The separation prevention pin 144 is configured to prevent the first moving plate 141 and the first push plate 142 from being spaced a predetermined distance or greater apart from each other. Accordingly, the pressure sensor unit 143 is prevented from being separated out of the first moving plate 141 and the first push plate 142.

A separation distance between the first moving plate 141 and the first push plate 142 may be adjusted while the first pressing assembly 140 presses against the pressing plate 210. That is, the first moving plate 141 and the first push plate 142 may be moved within a predetermined separation distance, and the first moving plate 141 or the first push plate 142 may be moved while being guided by the extension portion 154.

For example, the head portion 153 is configured in such a manner that, in a case where the first moving plate 141 is moved backward toward the first support frame 110, the first push plate 142 combined with an end portion of the extension portion 154 is also moved backward in a state where the head portion 153 is supported on the stepped jaw groove 155.

The apparatus 1000 for charging and discharging a secondary battery is configured to press against the pressure sensor unit 143 with a required pressure on the basis of an input value measured from the battery cell 10.

The pressure sensor units 143 are provided in such a manner as to be symmetrical about an imaginary vertical line V passing the center of the first pressing assembly 140. The apparatus 1000 for charging and discharging a secondary battery according to the first embodiment of the present disclosure is described above, taking as an example a case where two pressure sensor units 143 are provided, but the number of the pressure sensor units 143 is not necessarily limited to 2. The number of the number sensor units 143 may be 4, 6, or so forth.

Instead of one pressure sensor unit 143, two or more pressure sensor units 143 may be provided in such a manner as to be symmetrical about the imaginary vertical line V passing the center of the first pressing assembly 140. Thus, the pressure for pressing that is applied to each of the left and right sides of the pressing plate 210 pressing against the battery cell 10 may be precisely measured.

In this manner, the apparatus 1000 for charging and discharging a secondary battery performs control in such a manner that the pressure for pressing is uniformly applied to the pressing plate 210 without being unequally distributed to the left or right side of the pressing plate 210, on the basis of the input values measured by two pressure sensor units 143, respectively. Therefore, a uniform pressure for pressing may be provided on the entire pressing surface of the battery cell 10.

Since the pressure for pressing that is transferred from the first push plate 142 is measured by the two pressure sensor units 143, precision in pressure measurement may be further increased. That is, unlike in a case where one pressure sensor unit measures the pressure for pressing in the related art, according to the present disclosure, the two pressure sensor units 143 measure the pressure for pressing. Thus, because a maximum pressure value that is allocated to each of the pressure sensor unit 143 is decreased, the pressure sensor unit 143 may precisely measure the pressure for pressing that is transferred from the first push plate 142.

Figure 10:
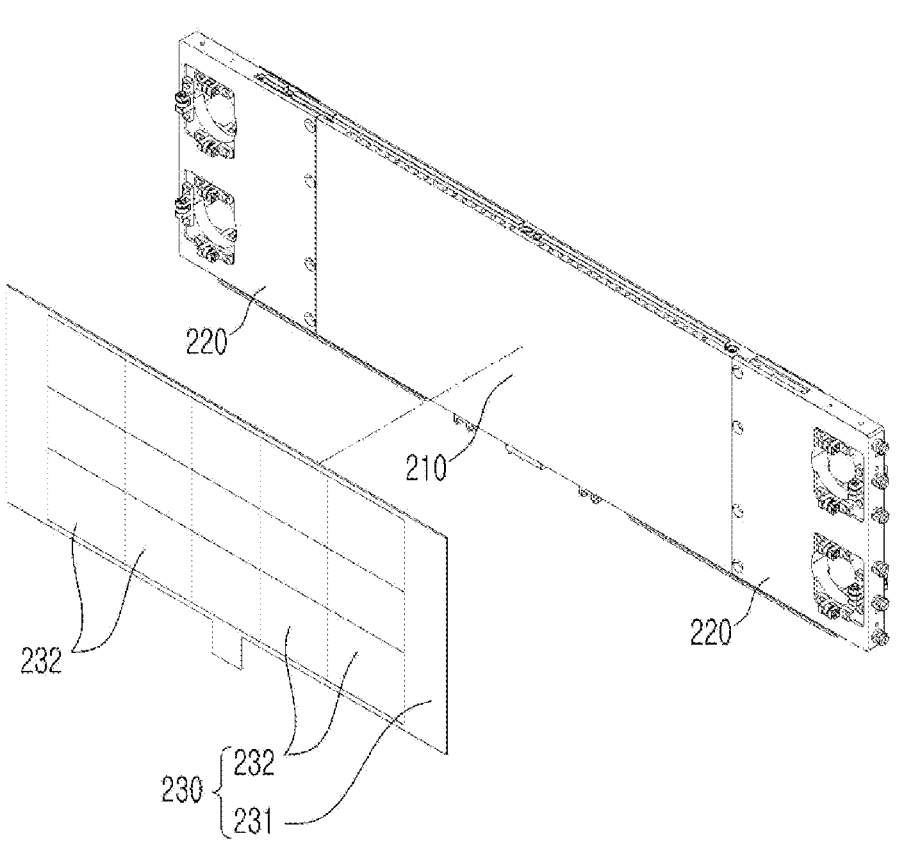
FIG. 10 is an exploded perspective view illustrating a pressing plate and a heating pad according to the first embodiment of the present disclosure.
Figure 11:
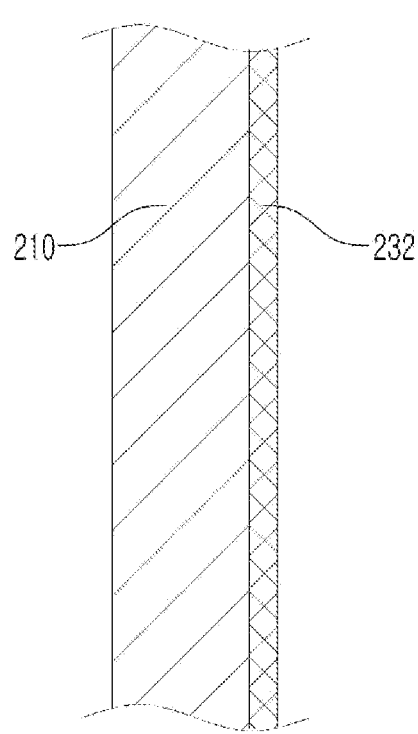
FIG. 11 is a cross-sectional view illustrating the pressing plate and the heating pad according to the first embodiment of the present disclosure.

FIG. 10 is an exploded perspective view illustrating the pressing plate 210 and the heating pad 230 according to the first embodiment of the present disclosure. FIG. 11 is a cross-sectional view illustrating the pressing plate 210 and the heating pad 230 according to the first embodiment of the present disclosure.

As illustrated in FIGS. 10 and 11, the heating pad 230 provided on the cell pressing module 200 is combined with one surface of the pressing plate 210. The heating pad 230 is configured to heat the pressing plate 210 to the predetermined temperature.

The heating pad 230 may include a pad support member 231 and a heating member 232. The pad support member 231 is configured to support a plurality of heating members 232 that are provided inside the pad support member 231. The pad support member 231 supports the heating member 232 and, at the same time, is electrically connected to the heating member 232. Thus, electric power transferred to the pad support member 231 may be supplied to the heating member 232.

In this manner, the heating pad 230 that is combined with one surface of the pressing plate 210 is configured in such a manner that a combination surface thereof corresponds to a combination surface of the pressing plate 210. That is, the pressing plate 210 and the heating pad 230 are configured in such a manner that the combination surfaces thereof correspond to each other.

In this manner, the pressing plate 210 presses against the battery cell 10 with a predetermined pressure in a state of being heated by the heating pad 230 to the predetermined temperature.

The heating pad 230 may be made from an epoxy plate in which a heating line is provided. The heating pad 230 made from the epoxy plate has an excellent combining force when combined with the pressing plate 210 and thus may be firmly combined with the pressing plate 210. In addition, the heating pad 230 made from the epoxy plate has high thermal conductivity at the combination surface. Thus, heat generated from the heat pad 230 may be effectively transferred to the pressing plate 210.

In this manner, the heating pad 230 that heats the pressing plate 210 may be heated to, for example, a temperature of 130° C. or below. It is more desired that the heating pad 230 heats the pressing plate 210 to a range of 110 to 130° C. However, the temperature to which the heating pad 230 heats the pressing plate 210 is not necessarily limited to 130° C. or lower. Of course, the pressing plate 210 may be heated to a temperature of above 130° C.

The cell pressing module 200 according to the present invention has a structure different from a structure where a heating pad is provided between two pressing plates in the related art. That is, the heating pad 230 is provided on one surface of the pressing plate 210. Thus, an operation of replacing the pressing plate 210 or the heating pad 230 may be simply performed. That is, the heating pad 230 and the pressing plate 210 are simply separated from each other. Thus, for example, in a case where the heating pad 230 needs to be replaced, the operator may simply replace the heating pad 230.

The cell pressing module in which the heating pad is inserted between the two pressing plates in the related art is designated in such a manner as to have a predetermined thickness. Due to the predetermined thickness of the cell pressing module, thicknesses of the pressing plates that are provided on both sides, respectively, of the heating pad have to be small. Therefore, the pressing plate that has a small thickness may be warped while the pressing plate presses against the battery cell 10. In this manner, in a case where the pressing plate is warped, there occurs a problem in that the warped pressing plate does not uniformly press against a pressing surface of the battery cell 10.

In order to solve this problem, the pressing plates that are provided on both sides, respectively, of the heating pad may be formed in such a manner as to have a predetermined thickness or greater. However, in this case, there occurs a problem in that the overall size of the cell pressing module is increased.

In contrast, in the cell pressing module 200 according to the present disclosure, the heating pad 230 is provided on only one surface of the pressing plate 210. Accordingly, the pressing plate 210 may have a predetermined thickness or greater. In this case, the pressing plate 210 may be warped while the pressing plate 210 presses against the battery cell 10. In addition, since the heating pad 230 is provided on only one surface of the pressing plate 210, a pressing surface of the pressing plate 210 that presses against the battery cell 10 may have exact parallelism.

The protective pad 240 to be provided on the cell pressing module 200 is configured to protect the pressing plate 210 and the heating pad 230 from the outside.

For example, a cover insertion space which is "☐"-shaped and into which the pressing plate 210 and the heating pad 230 may be formed in the protective pad 240, and the pressing plate 210 and the heating pad 230 may be covered with the protective pad 240.

The protective pad 240 may be formed of, for example, a silicone material. The protective pad 240 made of a silicon material is configured to prevent a surface of the battery cell 10 to be damaged due to the pressing plate 210 and the heating pad 230 while the pressing plate 210 presses against the battery cell 10.

Figure 12:
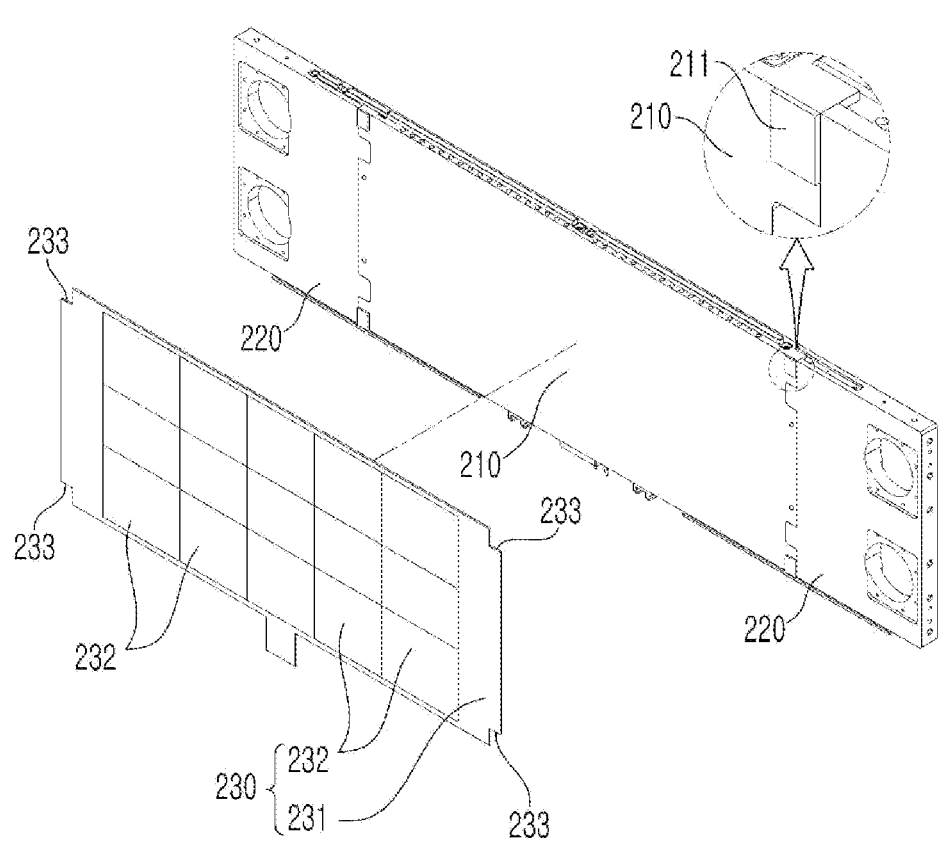
FIG. 12 is an exploded perspective view illustrating a pressing plate and a heating pad according to a second embodiment of the present disclosure.

FIG. 12 is an exploded perspective view illustrating a pressing plate and a heating pad according to a second embodiment of the present disclosure.

As illustrated in FIG. 12, a combination-position protrusion portion 211 is formed to protrude from a combination surface of the pressing plate 210 with which the heating pad 230 is combined. A combination-guide fixation jaw 233 that corresponds to the combination-position protrusion portion 211 is provided on an edge portion of the pad support member 231 provided on the heating pad 230.

When the heating pad 230 and the pressing plate 210 are combined with each other, the combination-position protrusion portion 211 and the combination-guide fixation jaw 233 are combined with each in a state where they are engaged with each other. In this manner, the combination-position protrusion portion 211 and the combination-guide fixation jaw 233 are configured to guide the heating pad 230 and the pressing plate 210 to a combination position when they are combined with each other.

It is desired that the combination-position protrusion portion 211 is configured in such a manner that a distance over which the combination-position protrusion portion 211 protrudes is the same as a thickness of the heating pad 230. The reason for this is to flatten surfaces of the heating pad 230 and the combination-position protrusion portion 211 with respect to each other in a state where the heating pad 230 is combined with the pressing plate 210.

The desired embodiments of the present disclosure that are described above are exemplary embodiments. Therefore, the scope of the present disclosure is not limited to the descriptions of the desired embodiments.

The desired embodiments of the present disclosure are described above in an exemplary manner. It would be understood by a person of ordinary skill in the art to which the present disclosure pertains that the desired embodiments of the present disclosure are readily modified into specific forms without changing the technical idea of the present disclosure and essential features thereof. Therefore, in every aspect, the desired embodiments described above should be understood as being exemplary and non-restrictive. For example, the constituent elements that are described as having their respective single forms may be implemented in a distributed manner, and likewise, the constituent elements that are described as being distributed may be implemented in a combined manner.

The scope of the present disclosure is defined by the following claims, and all modifications or alterations that are derived from the meaning of claim language and the scope of the claims and from equivalents of the claims should be construed as falling within the scope of the present disclosure.

The invention claimed is:

1. An apparatus for charging and discharging a secondary battery, the apparatus comprising:
   a support housing module configured to support constituent elements of the apparatus for charging and discharging a secondary battery,
   wherein the support housing module comprises:
   a first support frame;
   a second support frame spaced a predetermined distance apart by a support shaft from the first support frame and paired with the first support frame;
   a screw support bracket fixed to the support shaft by being supported thereon and provided between the first support frame and the second support frame;
   a first moving screw, one end portion thereof being combined with the first support frame and another end portion thereof being combined with the screw support bracket;
   a second moving screw, one end portion thereof being combined with the second support frame and another end portion thereof being combined with the screw support bracket;
   a first pressing assembly being moved along a lengthwise direction of the first moving screw as the first moving screw is rotated; and
   a second pressing assembly being moved along a lengthwise direction of the second moving screw as the second moving screw is rotated, and
   wherein pressure sensor units are provided on the first pressing assembly in such a manner as to be symmetrical about an imaginary vertical line passing the center of the first pressing assembly.

2. The apparatus of claim 1, wherein the first pressing assembly comprises:
   a first moving plate, a first screw nut to be combined with the first moving screw being provided on both sides of the first moving plate;
   a first push plate providing a pressing plate pressing against a battery cell with pressure for pressing that is transferred from the first moving plate, a support shaft being inserted into both sides of the first push plate for passing-through; and
   a pressure sensor unit provided between the first moving plate and the first push plate and measuring the pressure for pressing that is applied to the battery cell.

3. The apparatus of claim 2, further comprising:
   a separation prevention pin combined with the first moving plate and the first push plate and preventing separation of the pressure sensor unit,
   wherein the separation prevention pin comprises:
   a head portion supported on a stepped jaw groove formed in the first moving plate; and
   an extension portion extending from the head portion and fixed to the first push plate.

4. The apparatus of claim 2, wherein one side of the pressure sensor unit is inserted into a first sensor support groove formed in the first moving plate, and the other side of the pressure sensor unit is inserted into a second sensor support groove formed in the first push plate.

5. The apparatus of claim 2, wherein a pressure-for-pressing transfer member that protrudes from one surface of the first push plate and presses against the pressing plate is provided between first through-holes into which plate moving shafts, respectively, formed on both sides of the first push plate, are inserted for passing-through.

6. The apparatus of claim 1, wherein the first pressing assembly and the first moving screw are combined with each other in a manner that forms a TM screw, and the second pressing assembly and the second moving screw are combined with each other in a manner that forms a ball screw.

7. The apparatus of claim 1, further comprising:
   a plurality of cell pressing modules provided on the support housing module,
   wherein each of the plurality of cell pressing modules comprises:
   a pressing plate pressing against a battery cell; and
   a heating pad combined with one surface of the pressing plate and heating the pressing plate, and
   wherein the pressing plate and the heating pad are configured in such a manner that combination surfaces thereof correspond to each other.

8. The apparatus of claim 7, wherein the heating pad is an epoxy plate in which a heat line is provided.

9. The apparatus of claim 7, wherein the heating pad is heated to a temperature of 130° C. or below.

10. The apparatus of claim 7, further comprising:
   a protective pad covering the pressing plate and the heating pad,
   wherein a cover insertion space into which the pressing plate and the heating pad are inserted is formed in the protective pad.

11. The apparatus of claim 10, wherein the protective pad is formed of a silicone material.

12. The apparatus of claim 7, wherein a combination-position protrusion portion is provided on the combination surface of the pressing plate with which the heating pad is combined, in such a manner as to protrude from the combination surface of the pressing plate,
   wherein a combination-guide fixation jaw corresponding to the combination-position protrusion portion is configured to be provided on an edge portion of the heating pad, and
   wherein a distance over which the combination-position protrusion portion protrudes is the same as a thickness of the heating pad.

* * * * *